US007540551B2

(12) United States Patent
Oberheide

(10) Patent No.: US 7,540,551 B2
(45) Date of Patent: Jun. 2, 2009

(54) SYSTEM FOR POWER CLOSING OF A SELF RISING CLOSURE PANEL

(75) Inventor: G. Clarke Oberheide, Troy, MI (US)

(73) Assignee: Intier Automotive Closures, Inc., Newmarket, Ontario (CA)

( * ) Notice: Subject to any disclaimer, the term of this patent is extended or adjusted under 35 U.S.C. 154(b) by 505 days.

(21) Appl. No.: 10/577,981

(22) PCT Filed: Nov. 22, 2004

(86) PCT No.: PCT/CA2004/002008

§ 371 (c)(1),
(2), (4) Date: May 2, 2006

(87) PCT Pub. No.: WO2005/049947

PCT Pub. Date: Jun. 2, 2005

(65) Prior Publication Data

US 2007/0079556 A1 Apr. 12, 2007

(51) Int. Cl.
*B62D 25/00* (2006.01)

(52) U.S. Cl. ....................... 296/56; 49/339; 292/341.16

(58) Field of Classification Search .................. 296/56, 296/106, 76, 146.8; 49/339, 340; 292/241.16, 292/144, 201
See application file for complete search history.

(56) References Cited

U.S. PATENT DOCUMENTS

| | | | | |
|---|---|---|---|---|
| 4,707,007 | A | 11/1987 | Inoh | |
| 4,739,585 | A | 4/1988 | Pickles | |
| 5,938,254 | A | 8/1999 | Weyerstall | |
| 6,092,336 | A | 7/2000 | Wright et al. | |
| 6,126,222 | A | 10/2000 | Nguyen et al. | |
| 6,185,868 | B1 * | 2/2001 | Kato | 49/339 |

FOREIGN PATENT DOCUMENTS

| | | |
|---|---|---|
| CA | 1327055 | 2/1994 |
| WO | WO 01/63075 A1 | 8/2001 |

OTHER PUBLICATIONS

International Search Report and Written Opinion Dated Mar. 22, 2005.

* cited by examiner

*Primary Examiner*—Joseph D Pape
(74) *Attorney, Agent, or Firm*—Clark Hill PLC

(57) ABSTRACT

A power closing assembly operates a closure panel hingedly secured to a motor vehicle. The power closing assembly includes an actuator mounted to the motor vehicle, a movable striker also mounted to the motor vehicle to receive the closure panel's latch, and a rotary power cable connecting therebetween. The actuator has a closure cable on a spooling drum extending to the closure panel for closing from an open position when the actuator operates. The movable striker moves between a nominal inboard position and an outboard position. A rotary power cable connects between a provided output on the actuator and an input on the striker so that the striker's movement is powered and synchronized by the actuator. With the closure panel open, the actuator begins a closing cycle by driving in a direction to spool in the closure cable extending to the closure panel. The actuator's direction, using the rotary power cable, simultaneously causes the striker to move outboard. When the closure panel is pulled completely closed, the striker has also moved to its outboard position whereupon the closure panel's latch readily receives and engages the striker. Upon engagement, the actuator reverses its drive direction. This reverse direction causes both the actuator to reset with respect to its closure cable spooling drum and the rotary power cable to turn in the other direction causing the striker to return to its inboard position and fully close the closure panel against its seal load.

15 Claims, 4 Drawing Sheets

SYSTEM FOR POWER CLOSING OF A SELF RISING CLOSURE PANEL

FIELD OF THE INVENTION

The invention relates to power closure assemblies for automotive closure panels. More particularly, the invention relates to a power closing assembly that synchronizes the closing of the closure panel and movement of the striker to which the closure panel latches.

DESCRIPTION OF THE RELATED ART

Automotive closure panels are being automated as a convenience to the operators of the automobiles. To automate a closure panel, the mechanism must be able to perform two functions. The first function is the actual closing of the closure panel over the opening. This function is typically accomplished by having a linkage or cable assembly directly connected to the closure panel to pull the closure panel until it is slightly ajar with respect to the opening for which the closure panel closes. Being an automated system, this linkage or cable connection is powered by an electric motor.

The second function that must be accomplished is the cinching of the striker by the latch to secure the closure panel to the automobile. The cinching is required to create a seal between the closure panel and the automobile by having the closure panel pushed into a seal that surrounds the opening in the automobile. The cinching requires an additional force and is typically done by a second electric motor.

It is difficult to coordinate the motion of the closure panel and the movement of the striker to sequentially close the closure panel and then cinch the latch associated with the closure panel. The synchronization of these two functions often results in additional hardware which is often redundant in nature. In addition, the synchronization of these two functions becomes complex, introducing a higher degree of potential failure. Therefore, there is a need for an automated closure system that is simple in design and performance while maintaining the ability to synchronize the closing and cinching functions thereof.

SUMMARY OF THE INVENTION

A power closing assembly operates a closure panel that is hingedly secured to a motor vehicle. The power closing assembly includes a striker that is fixedly secured to the motor vehicle. The striker is movable between an inboard position and an outboard position. An actuator is fixedly secured to the motor vehicle spaced apart from the striker. The actuator includes a closure panel cable extending between the actuator and the closure panel for moving the closure panel from an open position to a closed position when the actuator is operable. The actuator includes a rotary drive that is operable when the actuator is operable. The power closing assembly also includes a rotary power cable that extends between the rotary drive and the striker such that the rotary power cable translates rotation of the rotary drive into movement of the striker between inboard and outboard positions.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
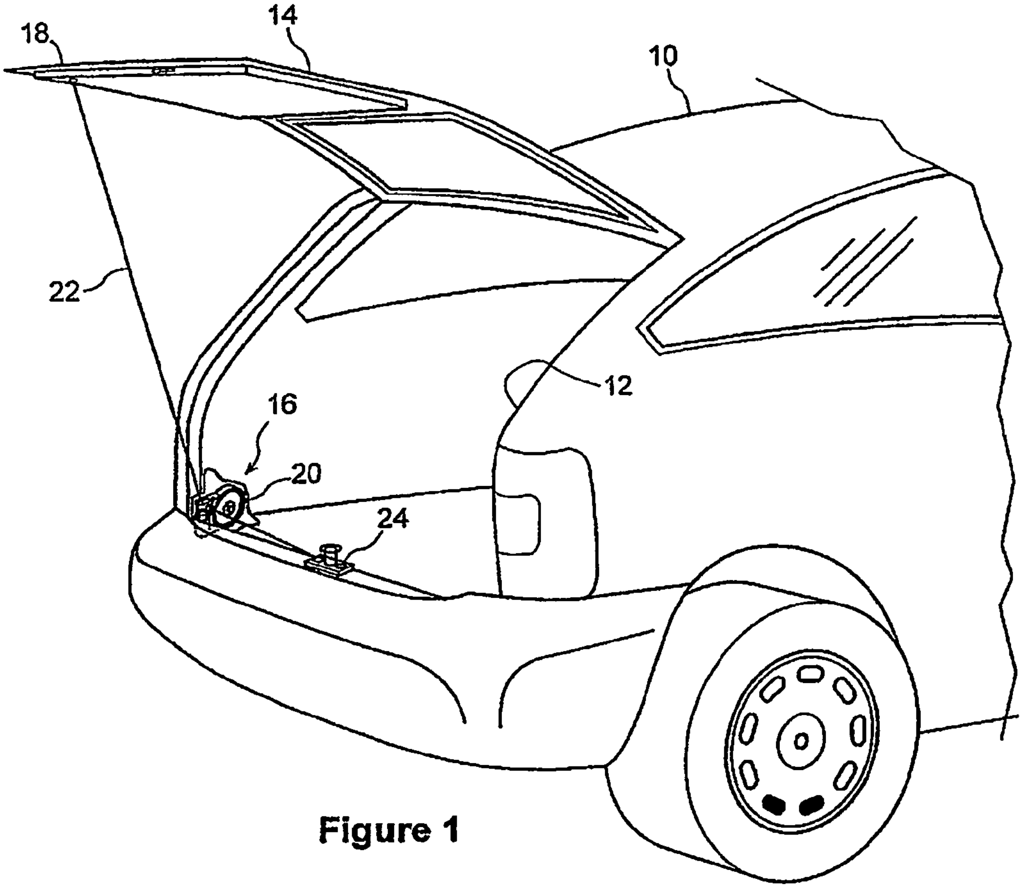
FIG. 1 is a perspective view, partially cut away of an automobile incorporating one embodiment of the invention.

Referring to FIG. 1, a motor vehicle 10 is shown partially cut away. The motor vehicle 10 defines an opening 12 providing access to the interior of the motor vehicle 10. A closure panel 14 is secured to the motor vehicle 10 and pivots between an open position as is shown in FIG. 1 and a closed position, wherein the closure panel 14 prevents access of the motor vehicle 10 through the opening 12. The closure panel 14 is secured to the motor vehicle 10 using hinges extending between the motor vehicle 10 and the closure panel 14. About the hinges are spring loads to counterbalance the closure panel 14 to its open position upon the unlatching thereof. While springs are used in the preferred embodiment, it should be obvious to those skilled in the art to use other devices to counterbalance the closure panel 14 to the open position.

A power closing assembly is generally indicated at 16. The power closing assembly 16 automatically closes the closure panel 14 when a control circuit indicates the closure panel 14 is to be closed as discussed in greater detail below. The power closing assembly 16 extends between the motor vehicle 10 and the closure panel 14. In FIG. 1, the power closing assembly 16 extends out to a distal end 18 of the It should be appreciated by those skilled in the art that the location where the power closing assembly 16 is secured to the closure panel 14 is dictated by the amount of force that the power closing assembly 16 may generate to overcome the counterbalance system and pull the closure panel 14 downwardly to its closed position. The power closing assembly 16 includes an actuator 20 that is fixedly secured to the motor vehicle 10. The actuator includes a closure panel cable 22. The closure panel cable 22 extends between the actuator 20 and the distal end 18 of the closure panel 14 and is moved in a direction represented by arrow 23. When the power closing assembly 16 is deactivated, allowing the closure panel 14 to be opened, the closure panel cable 22 will be allowed to move in a direction opposite that of arrow 23.

The power closing assembly 16 also includes a striker 24. The striker 24 is fixedly secured to the motor vehicle 10 and is movable between an inboard position and an outboard position. In the embodiment shown in FIG. 1, the striker 24 is fixedly secured to the motor vehicle 10. Typically, the striker 24 is secured to the motor vehicle 10 at a location along a side of the opening 12 such that the closure panel 14 will not incur stresses related to torsion of the closure panel 14.

Figure 2:
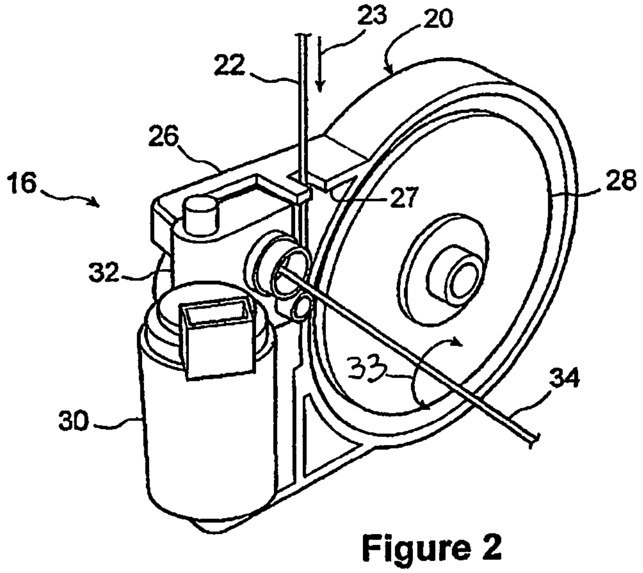
FIG. 2 is a perspective view of the invention with the cables attached thereto partially cut away.
Figure 3:
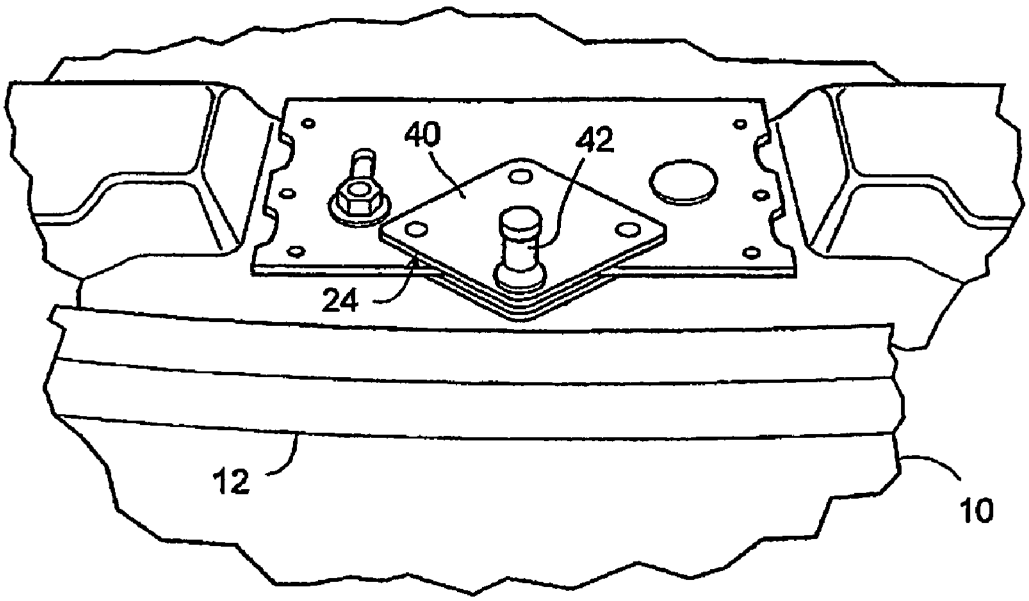
FIG. 3 is a perspective view of a motor vehicle, partially cut away, showing a striker utilized with the invention.
Figure 4:
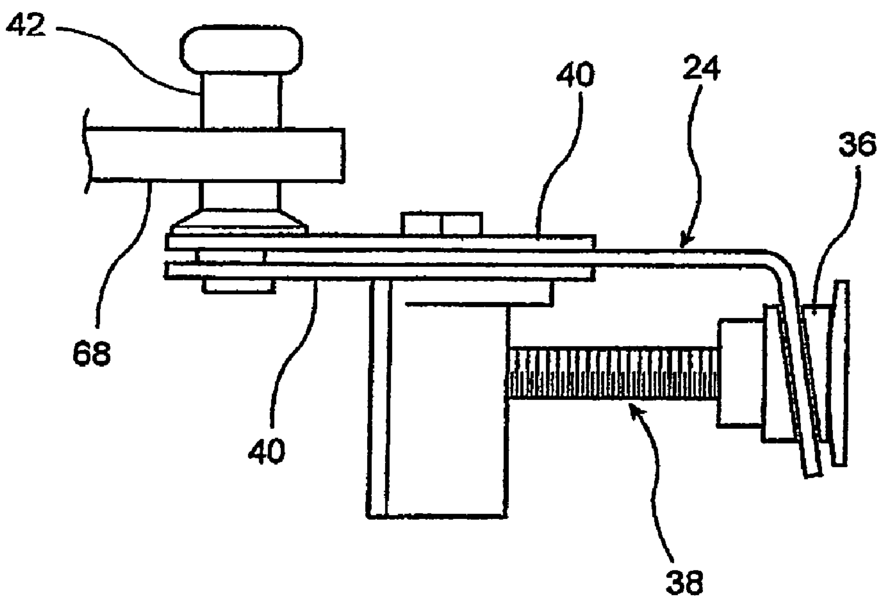
FIG. 4 is a side view of a striker utilized by the invention.

Referring to FIG. 2, the actuator 20 includes a housing, one piece of which is shown at 26. The housing 26 includes an aperture 27 allowing the closure panel cable 22 to extend therethrough. The housing 26 has a spooling drum 28 stored therein which rotates within the housing 26. The closure panel cable 22 is fixedly secured to the spooling drum 28 and thus wraps around the spooling drum 28 when it is rotated.

The actuator 20 also includes a motor 30 which is fixedly secured to the housing 26. The motor 30 has an output which drives a transmission 32 which, in turn, drives the spooling drum 28.

The transmission 32 has a rotary power cable 34 extending out therefrom. The rotary power cable 34 extends between the actuator 20 and the striker 24. The rotary power cable 34 is flexible allowing it to extend through a curved path if necessary. The rotary power cable 34 is rotated by the motor 30 bidirectionally, represented by arrow 33, such that the rotary power cable 34 rotates about its longitudinal axis with its sleeving remaining motionless. The transmission 32 translates the rotation of an output shaft of the motor 30 ninety degrees. Therefore, with the rotary power cable 34 fixedly secured, via a transmission coupling 35, to one of the gears of the transmission 32 at its axis of rotation, the rotary power cable 34 is directly coupled to the rotation of the gear.

When the rotary power cable 34 rotates, a striker coupling 36 of the striker 24 transmits the force created by the rotation of the rotary power cable 34 to a lead screw 38 which forces a drive plate 40 and the striker bar 42 between its inboard and outboard positions. The structure of the striker 24 is described in greater detail in co-pending patent application having 60/490,148, the description of which is incorporated herein by reference.

The motor 30 operates from a park position. When it retracts the closure panel cable 22, it rotates past the park position. After the closure panel cable 22 is fully retracted, and the closure panel 14 is in its closed position, the motor 30 backdrives itself to the park position. In doing so, it rotates the rotary power cable 34 in a direction that forces the striker 24 to its inboard position. This movement of the striker 24 to its inboard position after the closure panel 14 is in its closed position creates the seal between the closure panel 14 and the opening 12 of the motor vehicle 10.

Figure 5:
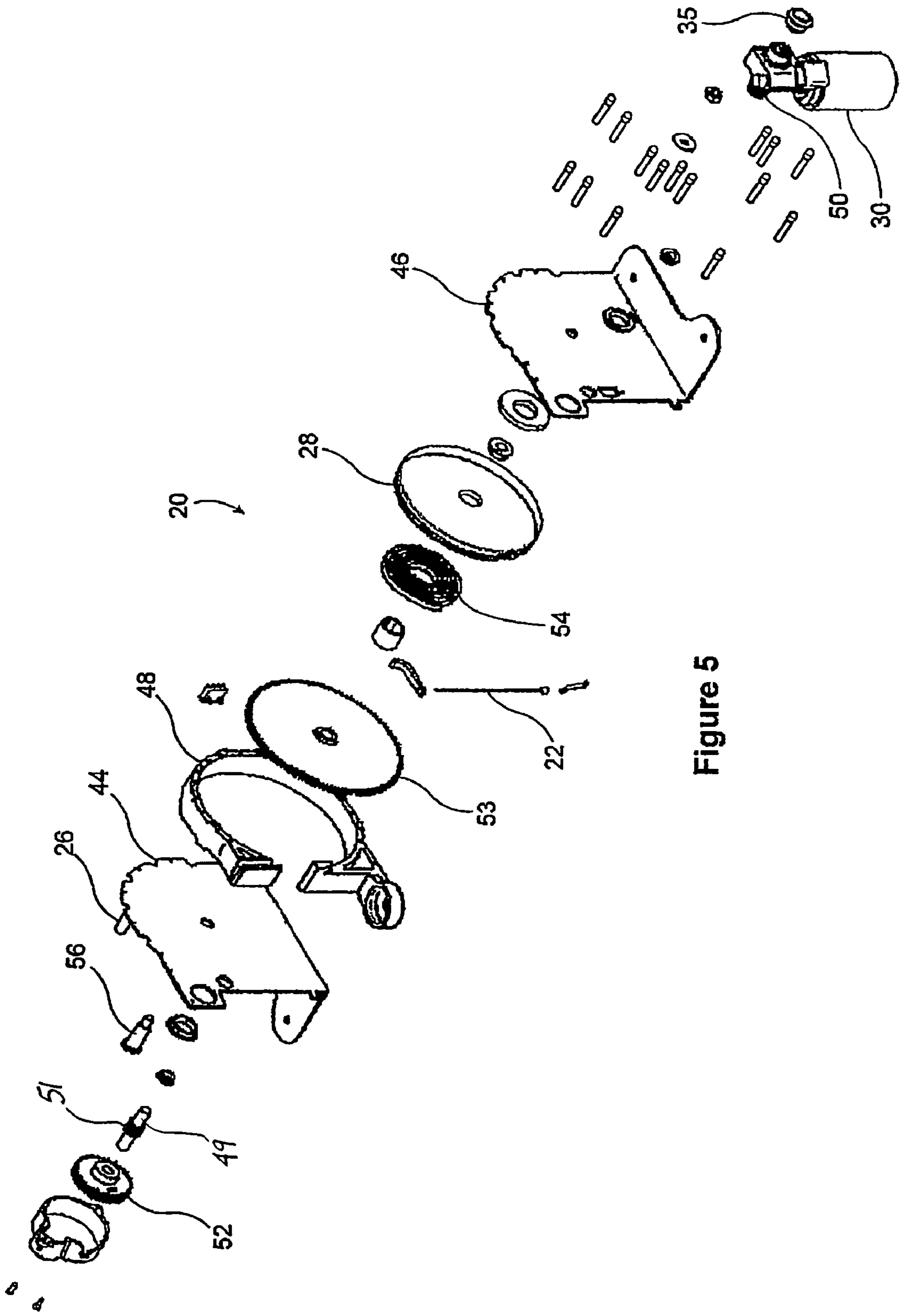
FIG. 5 is an exploded perspective view of an actuator of the invention.

Referring to FIG. 5, the actuator 20 is shown in an exploded perspective view. The actuator 20 includes the housing 26 having a back plate 44 and a cover plate 46. A drum casing 48 extends between the back 44 and cover 46 plates. The motor 30 is fixedly secured to the cover plate 46 and a pinion gear 50 extends therethrough to engage a drive gear 52. The drive gear 52 rotates about a shaft 49 that has a gear pinion 51 formed thereon. The gear pinion 51 meshes with a drum gear 53, which is secured to the spooling drum 28 such that when the drum gear 53 is rotated in one direction by the motor 30, the spooling drum 28 also rotates. A coil spring 54 extends between the drum gear 53 and the spooling drum 28 to provide a constant light tension force against the closure panel cable 22 whenever the closure panel 14 is not under powered operation. In the manual movement of the closure panel 14, the drum gear 53 is stationary and the spooling drum 28 is decoupled from the drum drive gear 53 using lost motion over a single revolution rather than by electro-mechanical or over running type clutches. The spooling drum 28 and the drum gear 53 rotate independently about an axle 56.

Figure 6:
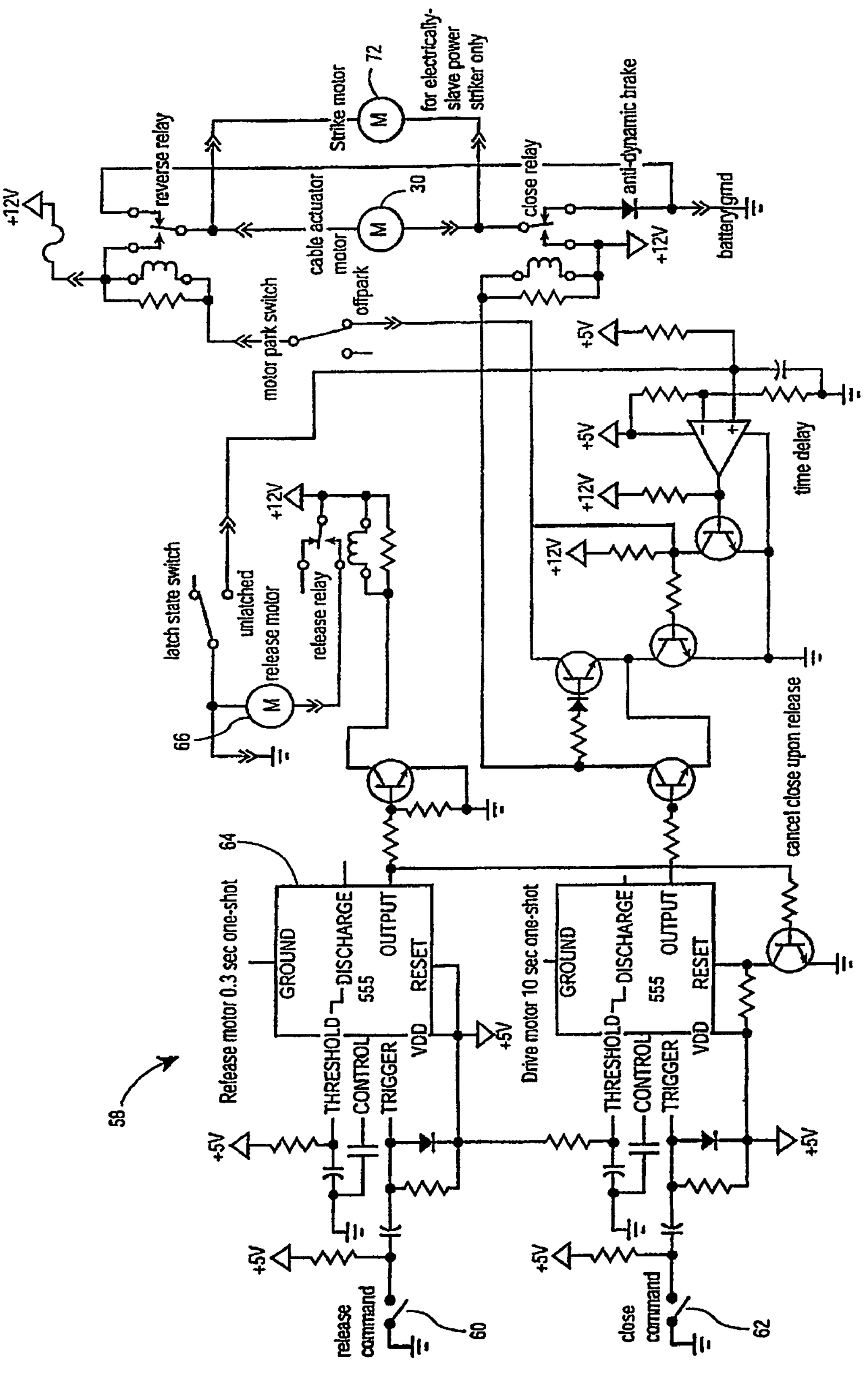
FIG. 6 is a schematic view of a controlled circuit for the invention.

Referring to FIG. 6, a control circuit for the power closing assembly 16 is generally indicated at 58. The inputs to the control circuit 58 are represented by a release switch 60 and a closed switch 62. The release switch 60 triggers a timer 64 that switches a latch motor 66. The latch motor 66 releases a latch 68 that is secured to the closure panel 14 which releases the striker 24. The striker 24 remains at its inboard position.

When the control circuit 58 receives a close command by the actuation of the close switch 62, a second timer is activated. Through a series of switches, the close command 62 activates the motor 30 which rotates to drive the spooling drum 28 to close the closure panel 14. By rotating the motor 30, the rotary power cable 34 rotates along with the motor 30. The rotation of the rotary power cable 34 moves the striker 24 to the outboard position allowing the latch 68 to engage the striker 24. The gears 50, 52, 53 and the gear pinion 51 are geared such that rotation of the motor 30 can directly drive the rotary power cable 34 as well as the spooling drum 28. More specifically, the shaft about which the pinion gear 50 rotates has the rotary power cable 34 fixedly secured thereto such that the rotary power cable 34 rotates equally with the pinion gear 50. The drive gear 52, gear pinion 51 and the drum gear 53 are all sized such that they can wind the closure panel cable 22 completely in the same time the rotary power cable 34 moves the striker 24 from its inboard position to its outboard position. Therefore, synchronization of the movement of the closure panel 14 and the striker 24 is not necessary as the timing of their respective movements is generated by a single device, e.g., the motor 30.

Upon the latch 68 engaging the striker 24, the motor 30 is stopped. At that time, the motor 30 is back driven to a park position, the drum gear 53 decouples from driving the spooling drum 28. The decoupling and lost motion achieved by returning the motor 30 and the drum gear 53 to the park position allows unrestricted manual operations of the closure panel 14.

Because there is no clutch in the power closing assembly 16, the rotary power cable 34 rotates with the motor 30 in either direction. Therefore, when the motor 30 back drives to the park position, the rotary power cable 34 moves in a direction opposite that in which it rotated when the closure panel 14 was being closed. This moves the striker 24 back to its inboard position. The movement of the striker 24 back to its inboard position results in the cinching of the latch 68 and the sealing of the closure panel 14 against the motor vehicle 10.

A striker motor 72 is shown to be removably securable to the terminals of the motor 30. The striker motor 72 is used in an alternative embodiment wherein the connection between the motor 30 and the striker 24 is electrical in nature and not mechanical. More specifically, the striker motor 72 operates with the motor 30 based on an electrical connection therebetween. The rotary power cable 34 would not be needed in this alternative embodiment.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A power closing assembly for a closure panel hingedly secured to a motor vehicle, said power closing assembly comprising:

a striker fixedly secured to the motor vehicle and movable between an inboard position and an outboard position;

an actuator fixedly secured to the motor vehicle spaced apart from said striker, said actuator including a closure panel cable extending between said actuator and the closure panel for moving the closure panel from an open position to a closed position when said actuator is operable, said actuator including a rotary drive operable when said actuator is operable; and a rotary power cable extending between said rotary drive and said striker such that said rotary power cable translates rotation of said rotary drive into movement of said striker between said inboard and outboard positions.

2. A power closing assembly as set forth in claim 1 wherein said actuator includes a motor drivable between a park position and fully deployed position.

3. A power closing assembly as set forth in claim 2 including a lead screw operatively connected between said striker and said rotary power cable to translate rotational motion of said rotary power cable into linear motion of said striker.

4. A power closing assembly as set forth in claim 3 wherein said actuator includes a transmission for converting said revolutions of said rotary power cable into said movement of said striker.

5. A power closing assembly as set forth in claim 4 including a coil spring for maintaining said closure panel cable in constant tension.

6. A power closing assembly as set forth in claim 5 including a spool drum for providing space for said closure panel cable to be stored.

7. A power closing assembly for a closure panel hingedly secured to a motor vehicle, said power closing assembly comprising:

a striker fixedly secured to the motor vehicle and movable between an inboard position and an outboard position;

an actuator fixedly secured to the motor vehicle spaced apart from said striker, said actuator including a closure panel cable extending between said actuator and the closure panel for moving the closure panel from an open position to a closed position when said actuator is operable, said actuator including a rotary drive operable when said actuator is operable; and a striker motor operatively connected to said actuator, said striker motor moving said striker between the inboard and outboard positions when said actuator is activated.

8. A power closing assembly as set forth in claim 7 wherein said actuator includes a motor drivable between a park position and fully deployed position.

9. A power closing assembly as set forth in claim 8 including a coil spring for maintaining said closure panel cable in constant tension.

10. A method for closing a closure panel of a motor vehicle using a motor, a striker, an actuator, having a closure panel cable, and a rotary power cable, defining a center axis, extending between the actuator and the striker, the method comprising the steps of:

energizing the motor using a polarity to generate a driving rotational force in a first direction;

driving the actuator using the driving rotational force in the first direction to close the closure panel;

rotating the rotary power cable using the driving rotational force in the first direction to move the striker to an outboard position;

reversing the polarity of the motor upon latch engagement to generate a back driving rotational force in a second direction;

allowing the actuator to reset to run freely in the second direction; and rotating the rotary power cable using the back driving rotational force in the second direction to move the striker to an inboard position to seal the closure panel with the motor vehicle.

11. A method as set forth in claim 10 wherein the step of rotating the rotary power cable is rotated about the center axis.

12. A method as set forth in claim 11 including the step of translating the rotation of the rotary power cable into a linear force to move the striker between its inboard and outboard positions.

13. A method as set forth in claim 12 including the step of backdriving the motor to a park position after the closure panel reaches a closed position.

14. A method as set forth in claim 13 including the step of sealing the closure panel during the step of backdriving the motor.

15. A method as set forth in claim 14 wherein the step of driving the actuator includes the step of winding the closure panel cable to move the closure panel toward the closed position.

* * * * *